United States Patent [19]
Feng

[11] Patent Number: 5,926,457
[45] Date of Patent: Jul. 20, 1999

[54] NETWORK CONTROLLER, AND METHOD OF CALCULATING THE IN TIME INTERRUPT POINT BY MEANS OF THE APPLICATION OF A FUZZY THEORY

[75] Inventor: Jung-You Feng, Hsinchu, Taiwan

[73] Assignee: D-Link Corporation, Hsinchu, Taiwan

[21] Appl. No.: 08/701,660

[22] Filed: Aug. 22, 1996

[51] Int. Cl.⁶ .............................. H04J 3/14; H04L 12/24; H04L 12/56
[52] U.S. Cl. .......................... 370/230; 370/252; 370/389; 395/200.8
[58] Field of Search ..................................... 370/230, 231, 370/232, 233, 234, 235, 252, 389, 412, 428, 429; 395/200.6, 200.62, 200.64, 200.65, 200.8

[56] References Cited

U.S. PATENT DOCUMENTS 5,274,625 12/1993 Derby et al. .............................. 370/233
5,341,366 8/1994 Soumiya et al. ......................... 370/233
5,572,520 11/1996 Schenk et al. .......................... 370/232

*Primary Examiner*—Alpus H. Hsu
*Attorney, Agent, or Firm*—Jacobson, Price, Holman & Stern, PLLC

[57] ABSTRACT

A network control method which employs a fuzzy theory to calculate the time point of producing the interrupt signal, so as to produce the interrupt signal in time before the data of the packet is completely stored in the buffer memory or the data buffer of the hot system. This invention relates also the hardware apparatus adapted for the application of the network control method.

10 Claims, 4 Drawing Sheets

NETWORK CONTROLLER, AND METHOD OF CALCULATING THE IN TIME INTERRUPT POINT BY MEANS OF THE APPLICATION OF A FUZZY THEORY

BACKGROUND OF THE INVENTION

1. Field of the Invention

The present invention relates to a network control method of calculating the in time interrupt point by means of the application of a fuzzy theory, and relates more particularly to such a network control method which employs a fuzzy theory to calculate the time point of producing the interrupt signal, so as to produce the interrupt signal in time before the data of the packet is completely stored in the buffer memory (or the data buffer of the host system). This method greatly shortens the time delay in processing the data of the packet, and improves the data processing speed of the network system. The invention relates also to the apparatus for the application of the network control method.

2. Description of the Prior Art

In the frame structure of an ethernet packet, as shown in FIG. 1, the first 8-byte set are the preamble and the start frame delimiter (SFD), the next 12-byte set are the destination and the source address, the further next 2-byte is the length, and the last are the data portion and the CRC (cyclic redundancy check). In a regular network as shown in FIG. 2, the network card 11 is comprised of a network controller 112, and a transceiver 111. The packet is transmitted from the transmission line 10 to the transceiver 111 of the network card 11, and then sent from the transceiver 111 to the network controller 112 after having been converted to a suitable form by the transceiver 111. The network controller 112 comprises a network interface logic 113, an interrupt threshold control logic 114, a buffer memory 115, and a host system interface logic 116. The interrupt threshold control logic 114 of the network controller 112 checks the packet being transmitted from the transceiver 111 whether the destination address of the packet is in conformity with its destination address. If the destination address of the packet is not in conformity with that of the interrupt threshold control logic 114 of the network controller 112, the network controller 112 stops processing the data. If the destination address of the packet is in conformity with that of the interrupt threshold control logic 114 of the network controller 112, the network controller 112 immediately stores the data of the packet in the buffer memory 115 (or the data buffer 122 of the host system 12) through the network interface logic 113. After the data of the packet has been completely stored in the buffer memory 115 (or the data buffer 122 of the host system 12), the interrupt threshold control logic 114 immediately checks the FCS(frame check sequence) of the packet. If the FCS is checked accurate, it means a normal packet has been received, thus, the interrupt threshold control logic 114 immediately sends an interrupt signal to the CPU 123 through the host system interface logic 116, informing the CPU 123 to process the data. According to the operation of this network system, as shown in FIG. 3, there is a time delay Δt after the presence of the interrupt signal before the processing of the data of the packet by the CPU. Furthermore, because the software takes a lot of time in processing the data, a certain length of time delay exists before the host system finishes the process of the data and after the production of the interrupt signal from the network controller 112. Because of this time delay, the bandwidth of the network system cannot be fully utilized, thereby causing the data transmission efficiency of the network system cannot be greatly improved.

SUMMARY OF THE INVENTION

The present invention has been accomplished to provide a network control method and a network controller for the application of the network control method which eliminate the aforesaid problem. According to one aspect of the present invention, the threshold value is calculated by means of the application of a fuzzy theory, and the time point of the dispatch of the interrupt signal is determined subject to the threshold value before the packet is completely stored in the buffer memory (or the data buffer of the host system), so that the time in which the packet is completely received can be accurately measured, and the interrupt signal can be produced in time, enabling the CPU of the host system to synchronously process the data of the packet when the packet is transmitted into the network system through the transmission line. According to another aspect of the present invention, a counter is provided to count the number of bytes of the packet before the packet is processed, so that the packet can be wholly received, and the time delay before the processing of the packet by the CPU of the host system and after the presence of the interrupt signal can be eliminated.

DETAILED DESCRIPTION OF THE PREFERRED EMBODIMENT

Figures 1, 3:
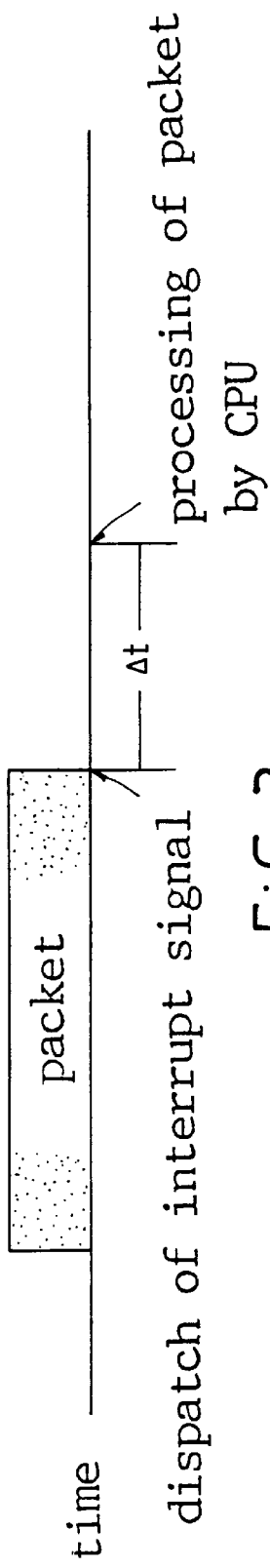
FIG. 1 shows the frame structure of an ethernet packet.
FIG. 3 is a schematic drawing showing the time delay after the presence of the interrupt signal and before the processing of the packet by the host system.
Figure 2:
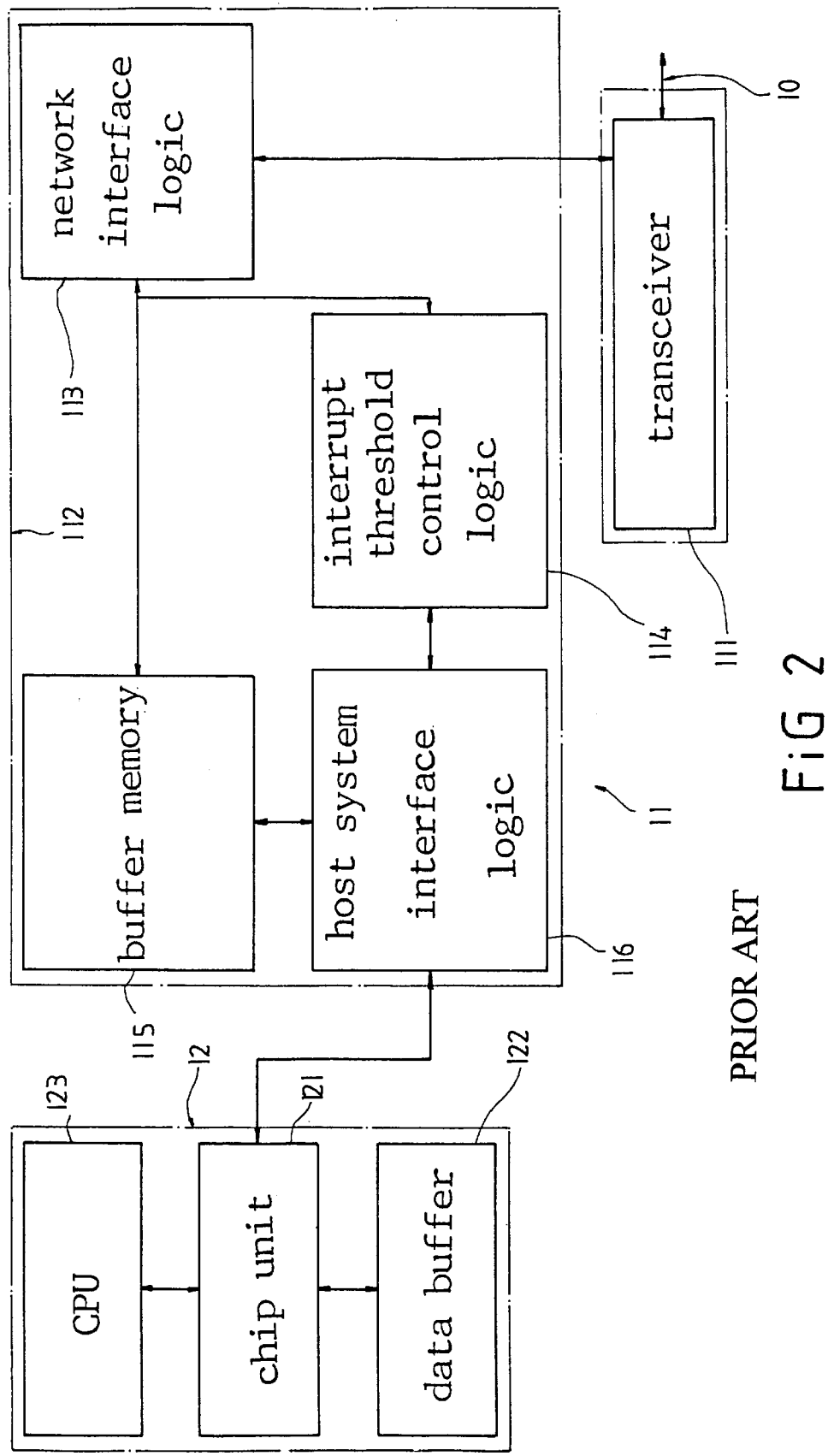
FIG. 2 is a block diagram showing the hardware structure of a network system according to the prior art.
Figure 4:
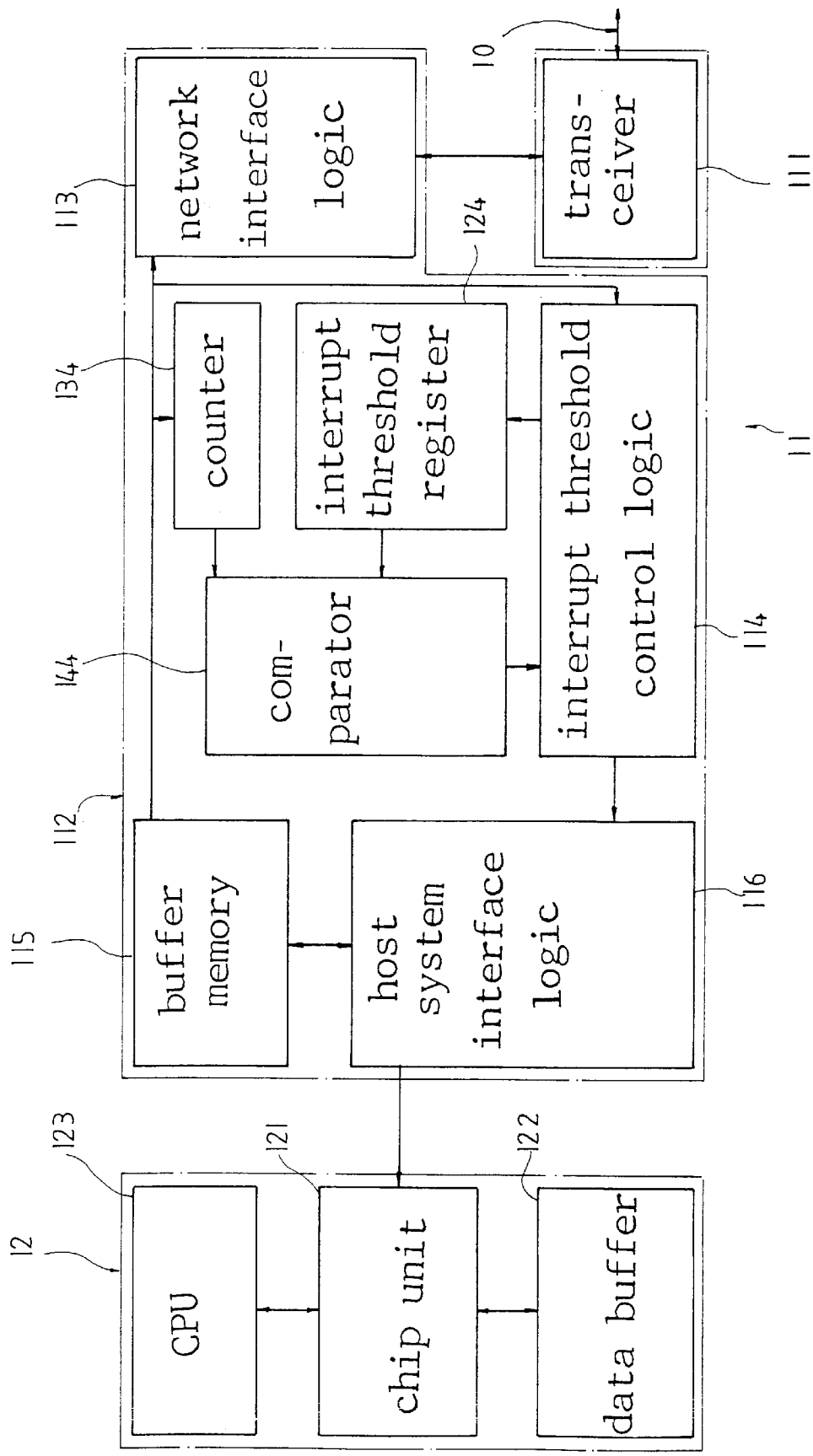
FIG. 4 is a block diagram showing the hardware structure of a network system according to the present invention.

Referring to FIG. 4, the network card 11 comprises a transceiver 111, and a network controller 112. The network controller 112 comprises a network interface logic 113, an interrupt threshold control logic 114, an interrupt threshold register 124, a counter 134, a comparator 144, a buffer memory 115, and a host system interface logic 116. When a packet is transmitted through the transmission line 10 to the transceiver 111 of the network card 11, it is converted into a suitable form and then sent by the network interface logic 113 from the transceiver 111 to the interrupt threshold control logic 114. The interrupt threshold control logic 114 reads in and counts the lengths of "m" number of previously received packets, so as to calculate the threshold value by means of the employment of the equation of a fuzzy theory as follows:

$$\text{threshold value} = \sum_{n=1}^{m} [Ln - F(\Delta t/800)]/m$$

in which, Ln is the length of the nth packet; F(x) is the smallest integer $\geq$x; Δt is the time delay after the presence of the interrupt signal and before the processing of the data by the CPU of the host system. The calculation unit is ns, and the calculated threshold value is stored-in the interrupt threshold register 124.

After receipt of the packet from the network interface logic 113, the interrupt threshold control logic 114 immediately checks the destination address. If the destination address of the packet is not in conformity with the destination address of the interrupt threshold control logic 114, the network controller 112 stops processing the data. If the target address of the packet is in conformity with that of the interrupt threshold control logic 114 of the network controller 112, the network controller 112 immediately stores the data of the packet in the buffer memory 115 (or the data buffer 122 of the host system 12) through the network interface logic 113. Further, the counter 134 counts the number of bytes of the packet being stored in the data buffer 115. The comparator 144 compares the number of bytes counted by the counter 134 with the threshold value stored in the interrupt threshold register 124. If the number of bytes counted by the counter 134 is equal to the threshold value stored in the interrupt threshold register 124, i.e., number of bytes of written-in packet=calculated threshold value, the interrupt threshold control logic 114 immediately produces an interrupt signal, and sends it to the CPU 123 of the host system 12 through the host system interface logic 116.

Figure 5:
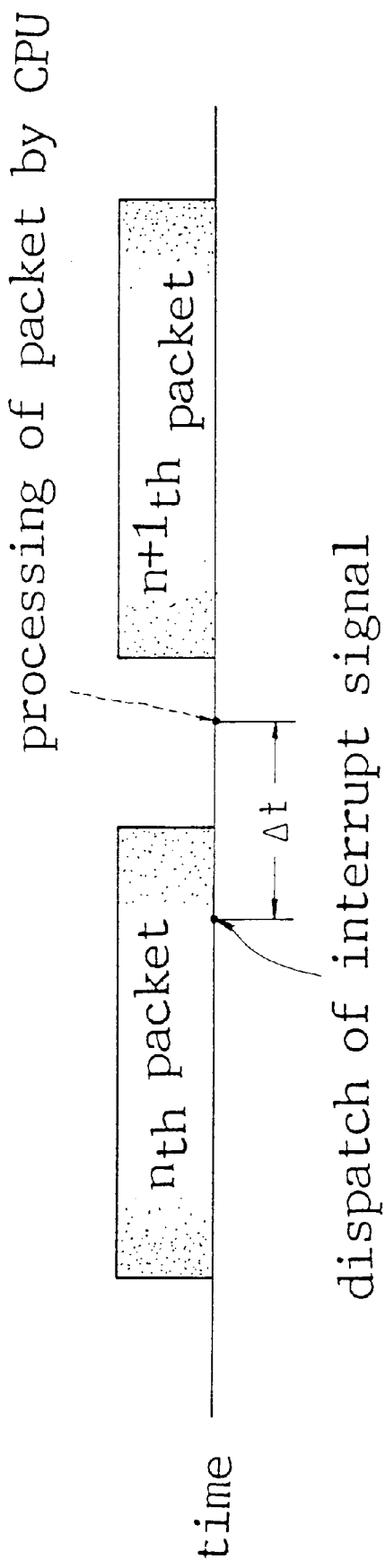
FIG. 5 is a time sequence chart showing the time sequence after the presence of the interrupt signal and before the processing of the packet by the host system.

Referring to FIG. 5, because the interrupt signal is provided to the CPU 123 of the host system 12 in advance, the time delay before the processing of the data of the packet by the CPU of the host system and after the presence of the interrupt signal is eliminated. Therefore, the data of the packet can be processed in time when the packet is sent through the transmission line into the network system.

It is to be understood that the drawings are designed for purposes of illustration only, and are not intended as a definition of the limits and scope of the invention disclosed.

What the invention claimed is:

1. A network controller comprising:
a network interface logic adapted for transmitting a packet received from the transceiver of a network system to an interrupt threshold control logic and a buffer memory;
the interrupt threshold control logic connected to said network interface logic, adapted for calculating a threshold value by reading in and counting the lengths of "m" number of last received packets from the transceiver of the network system by means of the application of a fuzzy theory, and producing an interrupt signal subject to the calculated threshold value;
the buffer memory adapted for storing the bytes of the packet transmitted from said network interface logic;
a counter adapted for recording the bytes of the packet stored in said buffer memory; and
a host system interface logic connected to said buffer memory and said interrupt threshold control logic, and adapted for transmitting the interrupt signal of said interrupt threshold control logic and the data of the packet to a host system;
wherein when the number of bytes counted by said counter is equal to the calculated threshold value, said interrupt threshold control logic immediately produces the interrupt signal, and sends it to said host system through said host system interface logic,
wherein the threshold value is calculated subject to the equation of the fuzzy theory of:

$$\text{threshold value} = \sum_{n=1}^{m} [Ln - F(\Delta t / 800)] / m$$

in which, Ln is the length of the nth packet: F(x) is the smallest integer$\geq$x; $\Delta t$ is the time delay after the presence of the interrupt signal and before the processing of the data by the CPU of the host system; the calculation unit is ns.

2. The network controller of claim 1 further comprising an interrupt threshold register adapted for storing the calculated threshold value.

3. The network controller of claim 1 further comprising a comparator adapted for comparing the number of bytes counted by said counter with the calculated threshold value, and driving said interrupt threshold control logic to produce the interrupt signal when the number of bytes is equal to the threshold value.

4. A network control method of calculating the in time interrupt point by means of the application of a fuzzy theory, the method comprising the steps of:
i) counting the lengths of N number of previously received packets before the currently received packet is completely written in a data buffer of the host system, so as to calculate and set a threshold value;
ii) counting and recording to the number of bytes of the currently received packet written in the data buffer; and,
iii) comparing the counted number of bytes with the set threshold value, and sending an interrupt signal to CPU of the host system in time when the number of bytes is equal to the threshold value;
wherein the threshold value is calculated subject to the equation of the fuzzy theory of:

$$\text{threshold value} = \sum_{n=1}^{m} [Ln - F(\Delta t / 800)] / m$$

in which, Ln is the length of the nth packet; F is the smallest integer$\geq$x; $\Delta t$ is the time delay after the presence of the interrupt signal and before the processing of the data by the CPU of the host system; the calculation unit is ns.

5. A network controller comprising:
a network interface logic adapted for transmitting a packet received from the transceiver of a network system to an interrupt threshold control logic and a buffer memory;
the interrupt threshold control logic connected to said network interface logic, adapted for calculating a threshold value by reading in and counting the lengths of "m" number of last received packets from the transceiver of the network system by means of the application of a fuzzy theory, and producing an interrupt signal subject to the calculated threshold value;
the buffer memory adapted for storing the bytes of the packet transmitted from said network interface logic;
a counter adapted for recording the bytes of the packet stored in said buffer memory;
a host system interface logic connected to said buffer memory and said interrupt threshold control logic, and adapted for transmitting the interrupt signal of said interrupt threshold control logic and the data of the packet to a host system;
wherein when the number of bytes counted by said counter is equal to the calculated threshold value, said interrupt threshold control logic immediately produces the interrupt signal, and sends it to said host system through said host system interface logic; and,
an interrupt threshold register adapted for storing the calculated threshold value.

6. The network controller of claim 5, wherein the threshold value is calculated subject to the equation of the fuzzy theory of:

$$\text{threshold value} = \sum_{n=1}^{m} [Ln - F(\Delta t / 800)]/m$$

in which, Ln is the length of the nth packet; F(x) is the smallest integer≧x; Δt is the time delay after the presence of the interrupt signal and before the processing of the data by the CPU of the host system; the calculation unit is ns.

7. The network controller of claim 5, further comprising a comparator adapted for comparing the number of bytes counted by said counter with the calculated threshold value, and driving said interrupt threshold control logic to produce the interrupt signal when the number of bytes is equal to the threshold value.

8. A network controller comprising:
 a network interface logic adapted for transmitting a packet received from the transceiver of a network system to an interrupt threshold control logic and a buffer memory;
 the interrupt threshold control logic connected to said network interface logic, adapted for calculating a threshold value by reading in and counting the lengths of "m" number of last received packets from the transceiver of the network system by means of the application of a fuzzy theory, and producing an interrupt signal subject to the calculated threshold value;
 the buffer memory adapted for storing the bytes of the packet transmitted from said network interface logic;
 a counter adapted for recording the bytes of the packet stored in said buffer memory;
 a host system interface logic connected to said buffer memory and said interrupt threshold control logic, and adapted for transmitting the interrupt signal of said interrupt threshold control logic and the data of the packet to a host system;
 wherein when the number of bytes counted by said counter is equal to the calculated threshold value, said interrupt threshold control logic immediately produces the interrupt signal, and sends it to said host system through said host system interface logic; and, a comparator adapted for comparing the number of bytes counted by said counter with the calculated threshold value, and driving said interrupt threshold control logic to produce the interrupt signal when the number of bytes is equal to the threshold value.

9. The network controller of claim 8, wherein the threshold value is calculated subject to the equation of the fuzzy theory of:

$$\text{threshold value} = \sum_{n=1}^{m} [Ln - F(\Delta t / 800)]/m$$

in which, Ln is the length of the nth packet; F(x) is the smallest integer ≧x; Δt is the time delay after the presence of the interrupt signal and before the processing of the data by the CPU of the host system; the calculation unit is ns.

10. The network controller of claim 8 further comprising an interrupt threshold register adapted for storing the calculated threshold value.

* * * * *